United States Patent Office 3,605,986
Patented Sept. 20, 1971

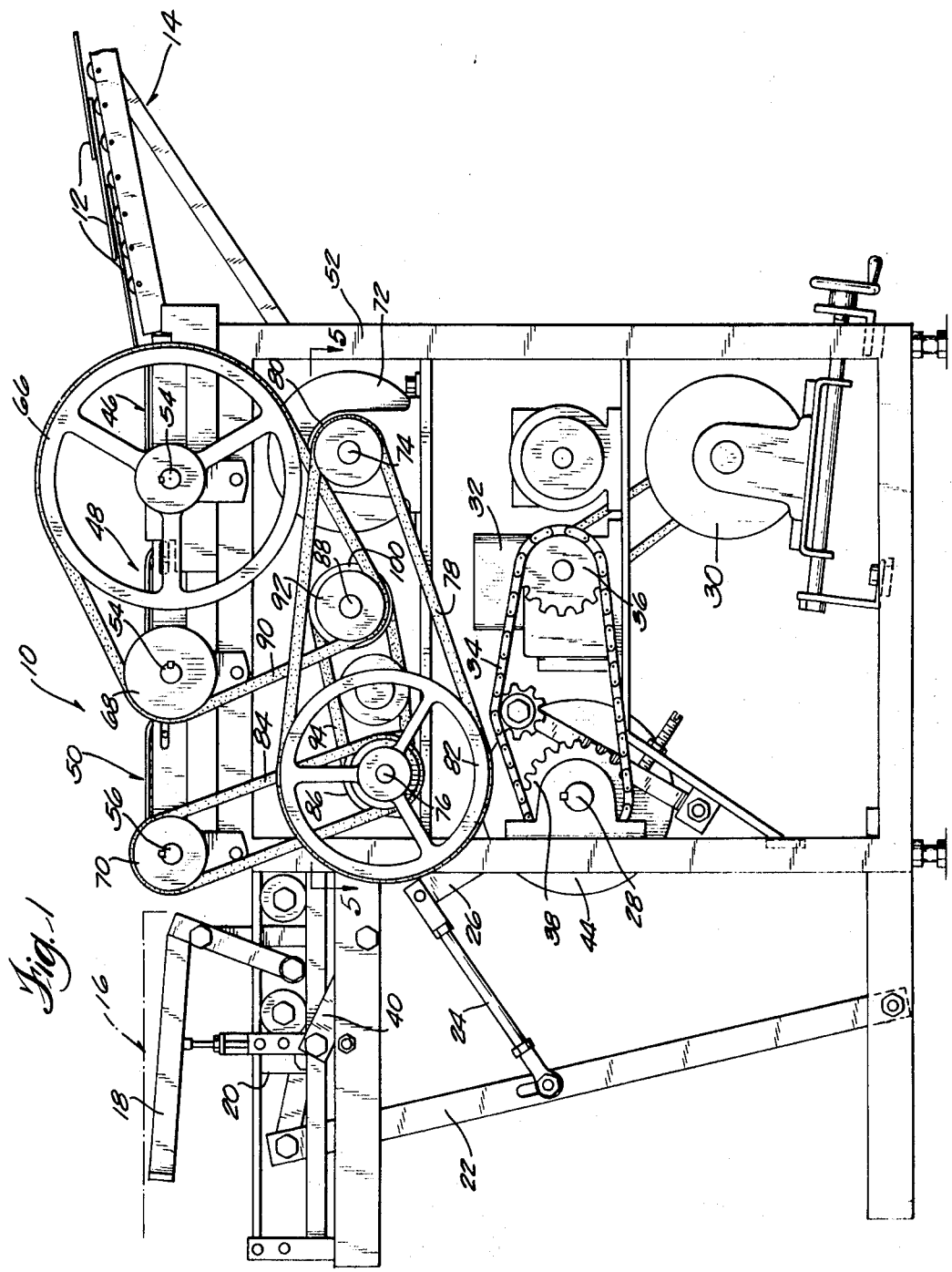

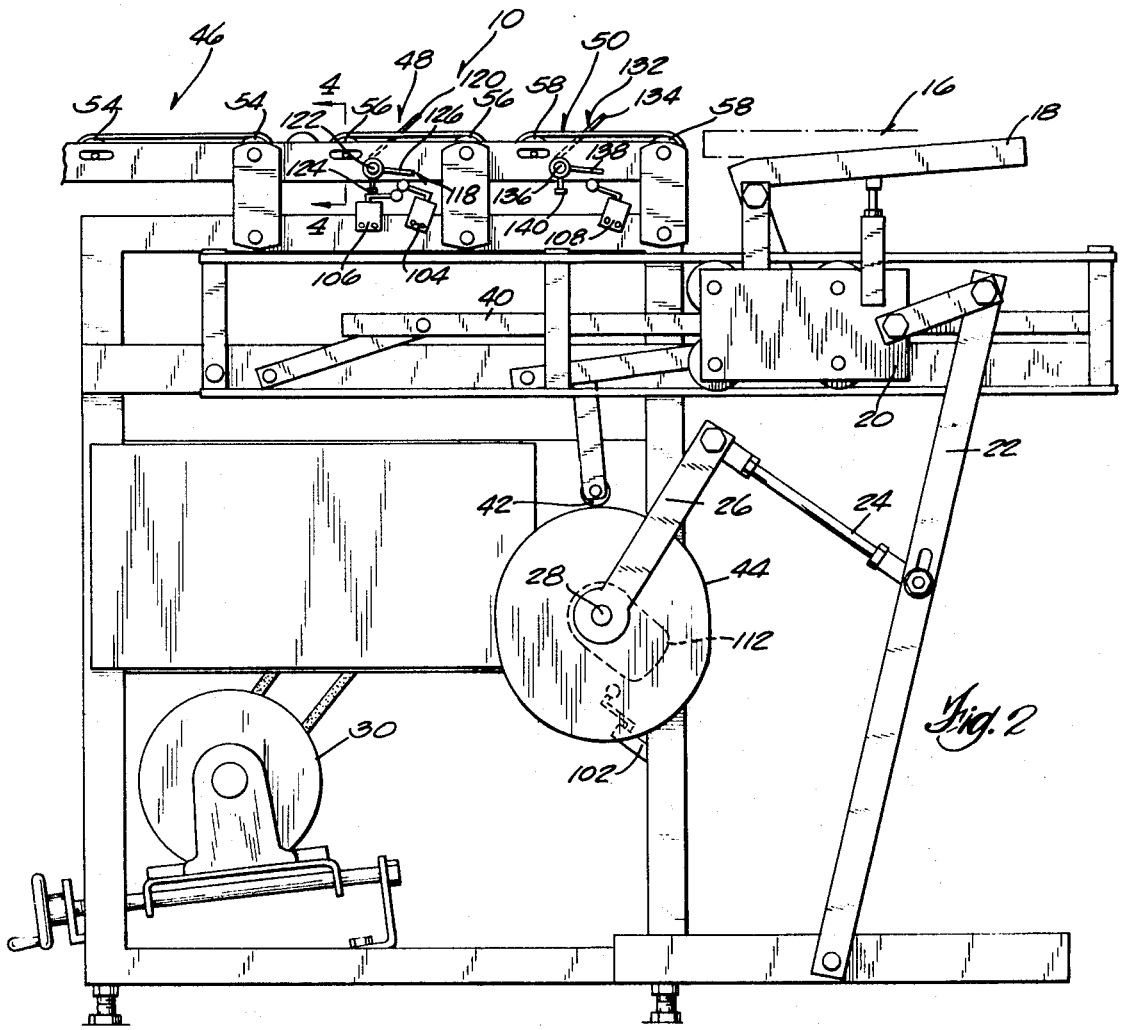

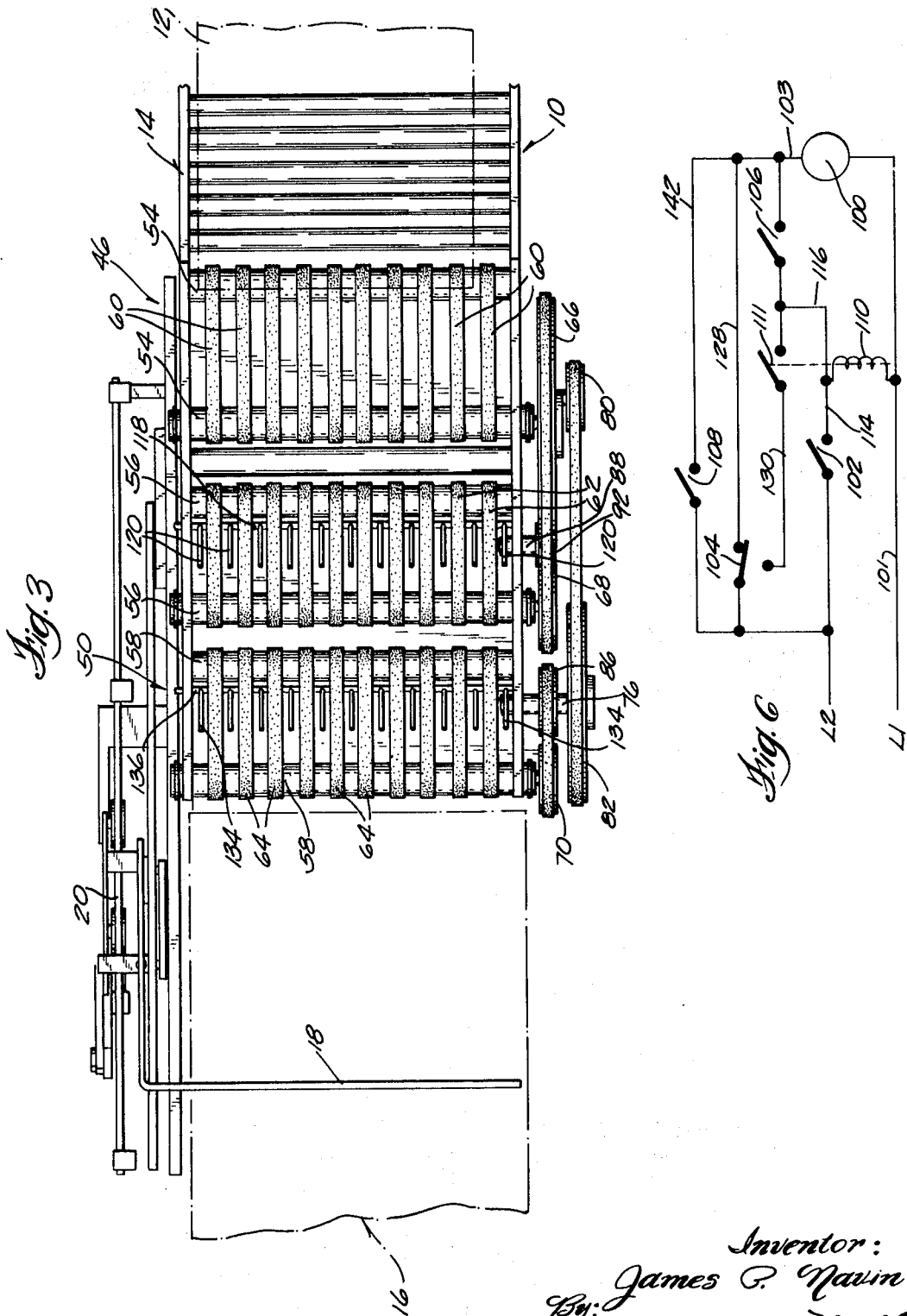

3,605,986
PACKAGE INDEXER
James P. Navin, Racine, Wis., assignor to Sturtevant Industries, Inc., Sturtevant, Wis.
Filed Nov. 13, 1969, Ser. No. 876,396
Int. Cl. B65g 47/26
U.S. Cl. 198—34
8 Claims

ABSTRACT OF THE DISCLOSURE

A prewrapped package indexer including a first belt type conveyor driven at a slow speed to seperate packages stacked in a shingled relation on an infeed conveyor, a second belt type conveyor to hold the package separated from the stack by the first conveyor at an intermediate position for timed delivery to a weighing and labeling device, a third belt type conveyor operating continuously at a high speed to transport the package from the second conveyor to the weighing and labeling device, and an electrical circuit to control the operation of the first and second conveyors in timed sequence with the operation of the labeling device.

BACKGROUND OF THE INVENTION

Prewrapping of packages particularly of meat prior to display has resulted in the development of many automatic wrapping, weighing and labeling machines. Some of these wrapping machines generally operate at a faster rate than the weighing and labeling machine, resulting in a pile-up or stacking of prewrapped packages prior to being fed to the scale.

Indexers of the type shown in U.S. Pat. 3,353,652 issued Nov. 21, 1967, entitled "Feeding and Indexing Device for Package Handling Apparatus" have been developed to separate the stacked packages and feed them to the scale in timed sequence with the operation of the labeling machine. However, difficulties have been encountered in using this type of indexer for separating flat packages such as prewrapped bacon with overlap in a shingled relation on the infeed conveyor making it difficult to remove or separate the packages for delivery to the scale.

SUMMARY OF THE INVENTION

The indexer of the present invention makes it possible to separate flat prewrapped packages, such as bacon which becomes stacked in a shingled relation on an infeed conveyor, and deliver the packages to a weighing and labeling device in timed seqeunce. This indexer includes three belt-type conveyors which are driven at progressively faster speeds. As a package is removed from the stack of packages on the infeed conveyor by the first slow speed conveyor, the speed of movement of the package is increased by the succeeding conveyors to separate the packages for delivery to the scale. The first two conveyors are operated intermittently and are stopped momentarily whenever a package reaches the second conveyor. The two conveyors are again actuated in timed sequence with the operation of the weighing and labeling machine to deliver the package from the second conveyor to the third conveyor for rapid movement onto the scale. The first and second conveyors will continue to operate until a package is separated from the infeed conveyor and transported to the second conveyor.

Other objects and advantages will appear hereinafter as this disclosure progresses, reference being had to the accompanying drawings.

BRIEF DESCRIPTION OF THE DRAWINGS

FIG. 1 is a side elevational view of the indexer showing the drive mechanism;

FIG. 2 is a side elevational view of the indexer, but taken from the side opposite to FIG. 1, and showing the pusher arm drive mechanism and switch arrangement;

FIG. 3 is a top view of the indexer;

FIG. 4 is a fragmentary, section view of a portion of one of the belt drive assemblies, the view being taken along line 4—4 in FIG. 2;

FIG. 5 is a fragmentary, plan view of the drive arrangement for the conveyors as shown in FIG. 3, certain parts being shown as in section or broken away for clarity; and FIG. 6 is a schematic view of the electrical circuit for timing the operation of the indexer.

DESCRIPTION OF THE INVENTION

The indexer 10 of this invention is used to separate a package 12 (FIG. 1) from the bottom of a stack of packages piled in a shingled relation on an inclined roller type conveyor 14, and to feed the separated package 12 along a path to a scale 16 in a weighing and labeling machine as shown in Pat. 3,353,652. The indexer 10 is actuated in timed sequence with the motion of a pusher arm 18 which is used to move packages from the scale 16 to an automatic labeling machine (not shown).

The pusher arm 18 is mounted on a carriage 20 which is reciprocated horizontally with respect to the scale 16 by a rocker arm 22 connected by a rod 24 to a lever arm 26 secured to one end of a shaft 28. The shaft 28 is driven off of the main drive motor 30 for the weighing and labeling machine through a reduction gear 32 (FIG. 1) having a drive sprocket 36 connected to a driven sprocket 38 secured to a shaft 28 by a chain 34. The pusher arm 18 is reciprocated vertically with respect to the scale 16 by a linkage 40 (FIG. 2) having a cam follower 42 positioned to ride on the surface of a cam 44 secured to the shaft 28. The motion of the pusher arm 18 is essentially the same disclosed in Pat. 3,353,652 where it is described in greater detail.

In accordance with the invention, indexer 10 includes means for receiving, means for holding and means for rapidly delivering packages 12 to the scale 16 in the form of three belt type conveyors 46, 48 and 50, respectively, which are mounted on a frame 52 located between the infeed conveyor 14 and the scale 16. Each of the three conveyors is driven at an increasingly faster speed in the direction of motion of the packages to separate the packages from each other as they are moved along a path and onto the scale 16. The first two conveyors 46 and 48 are stopped each time a package 12 reaches the second conveyor 48 and are started in timed sequence with the movement of the pusher arm 18 to deliver the package from the second conveyor 48 to the third conveyor 50 for rapid movement onto the scale 16. The first and second conveyors 46 and 48 will continue to operate until another package is separated from the stock on the infeed conveyor 14 and moves onto the second conveyor 48.

More particularly and referring to FIGS. 1 and 2, the conveyors 46, 48 and 50 as shown include pairs of roller shafts 54, 56 and 58, respectively which are journalled for rotation in the frame 52. A number of belts 60, 62 and 64 are spaced along and trained around each pair of the shafts 54, 56 and 58, respectively.

The conveyors 46, 48 and 50 are driven at progressively faster speeds by means of a number of sheaves 66, 68 and 70 of progressively smaller sizes. The first or large sheave 66 is secured to the end of one of the shafts 54 to drive the first conveyor 46 at a relatively slow speed. The second or intermediate sheave 68 is secured to the end of one of the shafts 54 to drive the second conveyor at an intermediate speed. The third or smallest sheave 70 is secured to the end of one of the shafts 56 to drive the third conveyor 50 at a faster speed than the second conveyor 48.

The conveyors 46, 48 and 50 are driven by means of an electric motor 72 mounted on the frame 52 and having a drive shaft 74. The motor 72 is connected to drive a main drive shaft 76 journalled in the frame 52 by a belt 78 reeved around a sheave 80 on drive shaft 74 and a sheave 82 secured to the main drive shaft 76. The third conveyor 50 is driven directly off of the main drive shaft 76 by a belt 84 reeved around a sheave 86 on the main drive shaft 76 and the sheave 70 on the conveyor 50. The first and second conveyors 46 and 48 are driven off of the main drive shaft 76 through an idler shaft 88 journalled in the frame 52. The idler shaft is connected to the first and second conveyors by a belt 90 reeved around sheaves 66 and 68 and a sheave 92 on the shaft 88. The idler shaft 88 is connected to the main drive shaft 76 by a belt 94 reeved around a sheave 96 mounted to rotate freely on the idler shaft 88 and a sheave 98 mounted on the main drive shaft 76.

The first and second conveyors 46 and 48 are intermittently driven in timed sequence with the operation of the pusher bar 18 by means of a magnetic clutch 100 mounted on the idler shaft 88. The clutch 100 is secured to the shaft 88 and is actuated to connect the sheave 96 to the shaft 88 whenever the first and second conveyors are to be operated.

The magnetic clutch 100 is controlled by means of an electric circuit (FIG. 6) which includes a timing switch 106, an over-ride switch 108, and a relay 110 connected to control a switch 111. The clutch 100 is connected across a power source designated by L1 and L2 by a line 101 and a line 103 through the switches 102, 104, 106, 108 and 111. The timer switch 102 is mounted on the frame 52 and is actuated by a cam 112 mounted on the shaft 28 which is used to drive the pusher arm 18. The timer switch 102 is momentarily closed each time the cam 112 completes one revolution and the pusher arm has been moved off the scale 16. The timer switch 102 is connected to energize the relay 110 by a line 114 to close switch 111. The timer switch is also connected to the holding switch 106 by a line 116 to complete the circuit between L2 and line 103 to the magnetic clutch 100.

The double acting stop switch 104 and normally open holding switch 106 are mounted on the frame 52 next to the second conveyor 48 and are actuated by means of a switch actuator 118 located in the second conveyor 48. The switch actuator 118 includes a number of tanks 120 secured to a rod 122 journalled in the frame 52. The tangs in the rod 122 are normally biased by means of a weight 124 in the form of a screw mounted on the end of the rod 122 to extend upwardly in the direction of movement of the packages between the belts 62 in the second conveyor 48. A lever arm 126 is provided at the end of the rod 122 in a position to engage the switches 104 and 106. Whenever a package moves onto the belts of the second conveyor, tangs 120 will be pushed downwardly rotating the rod 122 and moving the arm 126 into engagement with the switches 104 and 106. The stop switch 104 is connected to the line 103 for the clutch 100 by a line 128 and is connected to the relay switch 111 by a line 130. The stop switch 104 normally closes the circuit through line 128 and when actuated by a package closes the circuit through relay switch 111. The holding switch 106 is normally open and when actuated completes the circuit from the timer switch 102 through line 116 to the clutch and the circuit from the stop switch 104 through line 130 to the clutch 100.

The over-ride switch 108 is mounted on the frame 52 next to the third conveyor 50 and is actuated by means of a switch actuator 132 provided in the third conveyor 50. The switch actuator 132 includes a number of tangs 134 mounted on a rod 136 journalled in the frame 52. A lever arm 138 is provided on the end of the rod 136 in a position to engage the over-ride switch 108. The switch actuator 132 is normally biased by means of a weight 140 in the form of a screw with the tangs extending upwardly between the belts 64. When a package moves across the third conveyor engaging the tangs 134, the rod 136 will be rotated moving the arm 138 into engagement with the switch 108. The switch 108 is connected to the clutch 100 by a line 142 to complete the circuit to the clutch. Closing of the switch 108 sets up a holding circuit which assures continued operation of the first and second conveyors until the package clears the third conveyor.

In operation, the timing switch 102 is closed momentarily by the cam 112 energizing relay 110 and closing switch 111. If a package is on the second conveyor, the stop switch 104 and holding switch 106 will be closed completing the circuit through lines 130 and 103 to the clutch 100. The timing switch is only closed momentarily and normally the relay 110 would be de-energized, however, closing of the holding switch 106 sets up a holding circuit through line 116 to the relay 110. As soon as the package clears the second conveyor, the stop switch 104 and holding switch 106 will return to their normal positions opening the circuit through relay switch 111 and relay 110 and de-energizing the relay. Stop switch 104 in the normal position closes the circuit through line 128 to the clutch 100. As the package moves to the third conveyor, the holding switch 108 is closed completing the circuit to the magnetic clutch 100 through line 103. Switch 108 remains closed until the package clears the third conveyor. The first and second conveyors will continue to operate after switch 108 opens because switch 104 is closed. When the next package moves onto the second conveyor and engages the switch actuator 118 opening switch 104 in the circuit through line 128, the clutch will be de-energized and switch 104 and 106 will close the circuit through line 130. However, the circuit through line 130 is not complete until relay switch 111 closes. As soon as switch 102 is closed by cam 112 the cycle will be repeated. It should be noted that the first and second conveyors will continue to operate until a package moves onto the second conveyor 48.

RÉSUMÉ

By means of the present invention, an indexer is provided for separating flat prewrapped packages stacked in a shingled relation on an inclined infeed conveyor; a first conveyor provides means for receiving packages from the stack and conveys the separated packages to a second conveyor, the second conveyor provides means for holding the packages at an intermediate position for timed delivery to a third conveyor, the third conveyor provides means for rapidly delivering the package along a path to a weighing and labeling machine. Control of the operation of the first and second conveyors is provided by means of an electric circuit having a timing switch actuated in response to the operation of the labeling machine to actuate the first and second conveyors, a holding switch to stop the first and second conveyors when a package reaches the second conveyor and a magnetic clutch operatively associated with the first and second conveyors and controlled by the timing switch and holding switch.

What is claimed is:

1. A package indexer conveyor comprising, an infeed conveyor for supporting a plurality of flat prewrapped packages, and a package indexer for separating packages from said infeed conveyor and feeding said separated packages along a path in timed sequence, said indexer including a frame, a first conveyor mounted on said frame for receiving the bottom package from the packages stacked on the infeed conveyor, a second conveyor mounted on said frame in a position to remove the lowermost package from said first conveyor, a third conveyor mounted on said frame for delivering the separated package along said path, said second conveyor being driven at a faster speed than said first conveyor, said third conveyor being driven at a faster speed than said second conveyor, and means for driving said first and second conveyors in timed sequence with the operation of the conveyor system, said driving means including a magnetic clutch operatively connected to drive said first and second conveyors and an electric circuit connected to said clutch and including a timing switch to energize the magnetic clutch in timed sequence with the operation of the conveyor assembly.

2. The combination according to claim 1 wherein said electric circuit includes a stop switch positioned for engagement by a package on said second conveyor and connected to de-energize the magnetic clutch when engaged by a package on the second conveyor.

3. The combination according to claim 2 wherein said electric circuit includes a holding switch on said third conveyor to maintain the magnetic clutch energized until the package clears said second conveyor.

4. The combination of an infeed conveyor for supporting a plurality of flat prewrapped packages, a package weighing and labeling device and a package indexer for separating packages from said infeed conveyor and feeding said separated packages to the scale in timed sequence, said indexer comprising, a frame, means for receiving the bottom package from the packages on the infeed conveyor, means for holding the separated package in an intermediate position, means for rapidly delivering the separated package to the device, said holding means being driven at a faster speed than said receiving means and at a slower speed than said delivering means, and means for driving said receiving means and said holding means in timed sequence with the operation of said device, said driving means including a magnetic clutch operatively connected to drive said receiving means and said holding means and an electric circuit connected to said clutch and including a timing switch to energize said magnetic clutch in timed sequence with the operation of the scale.

5. The combination according to claim 4 wherein said electric circuit includes a stop switch to de-energize said magnetic clutch when a package is positioned on said holding means.

6. The combination according to claim 5 wherein said electric circuit includes a holding switch for maintaining the magnetic clutch energized until the package clears said holding means.

7. A package indexer for receiving a package from an infeed conveyor and feeding the package along a path in a timed sequence, said indexer comprising a frame having a first belt type conveyor, a second belt type conveyor, and a third belt type conveyor sequentially arranged along the path, means for driving said conveyors at progressively faster speeds, and means for controlling the operation of said first and second conveyors in a timed sequence to deliver packages to the said third conveyor, said controlling means comprising an electric circuit including a magnetic clutch and a timing switch for intermittently actuating said clutch.

8. An indexer according to claim 7 wherein said circuit includes a stop switch connected to said clutch to stop said first and second conveyors when a package reaches said second conveyor.

References Cited
UNITED STATES PATENTS

| | | | |
|---|---|---|---|
| 1,160,792 | 11/1915 | Houten | 198—34 |
| 3,155,221 | 11/1964 | Griner | 198—76X |
| 3,353,652 | 11/1967 | Fellner | 198—34 |

EDWARD A. SROKA, Primary Examiner